United States Patent [19]

Nickolaus

[11] Patent Number: 4,908,806

[45] Date of Patent: Mar. 13, 1990

[54] DIRECTIONAL SPRING FOR AC SYNCHRONOUS MOTOR

[75] Inventor: Robert D. Nickolaus, Chatham, Ill.

[73] Assignee: Stewart Warner Corporation, Chicago, Ill.

[21] Appl. No.: 278,583

[22] Filed: Dec. 1, 1988

[51] Int. Cl.⁴ ............................................. C04F 8/00
[52] U.S. Cl. ........................................ 368/9; 368/1; 368/89; 368/107; 368/156
[58] Field of Search ................ 368/1, 9, 89, 107, 156, 368/160

[56] References Cited

U.S. PATENT DOCUMENTS

| | | | |
|---|---|---|---|
| 2,543,946 | 3/1951 | Tener | 368/89 |
| 2,551,179 | 5/1951 | Spencer | 368/89 |
| 3,004,218 | 10/1961 | Stanley | 368/9 |
| 3,965,669 | 6/1976 | Larson et al. | 368/9 |

Primary Examiner—Bernard Roskoski
Attorney, Agent, or Firm—Lorusso & Loud

[57] ABSTRACT

A directional starting spring which ensures that an AC synchronous motor is rotating in the proper direction is disclosed. The AC synchronous motor includes a circular magnet rotating in "synch" with the frequency of the alternating current. The magnet rotates a worm gear attached to the center on its axial face. This worm gear drives a second worm gear positioned perpendicular to the first worm gear. The second worm gear drives a series of gears which display the elapsed time. Attached to this second worm gear is the directional starting spring. If the motor is rotating in the proper direction the spring contacts the housing of the meter and slides on the second worm gear. If the motor is rotating in the wrong direction the spring contacts the axial face of the magnet stopping the rotating magnet and pushing it in the proper direction.

8 Claims, 2 Drawing Sheets

DIRECTIONAL SPRING FOR AC SYNCHRONOUS MOTOR

BACKGROUND OF THE INVENTION

This invention relates to a device that ensures a synchronous motor is moving in the proper direction. Synchronous motors are used for many timing applications as these motors run at synchronous speed or not at all. However, these motors will run in either direction. Therefore, in order to ensure that time is being measured it is imperative that these devices only run in one direction.

Elapsed time meters are used on equipment to measure run time for purposes of maintenance and warranty. These elapsed time meters are relatively inexpensive. In some applications, particularly hospital equipment, noise can be a problem with these elapsed meters. The noise occurs due to rattle and chatter of the gears in the timing mechanism. The present device solves this problem in a unique and inexpensive manner.

SUMMARY OF THE INVENTION

The elapsed time meter of the present invention employs a self-starting shaded pole synchronous motor. The motor is powered by alternating current at 60 cycles/second frequency. The speed of the clock is dependent on the frequency of the current. Throughout the U.S. however, line frequency is both properly stabilized and corrected several times daily, eliminating accumulated error and permitting an accuracy of up to plus-or-minus four seconds per day. Hence, these synchronous clocks make inexpensive and accurate elapsed time meters in the United States.

The synchronous motor of the present invention operates in the following manner. A permanent circular magnet sits in the center of a rotating magnetic field. The rotating magnetic field is produced by alternating stator elements and cup elements which surround the outer diameter of the magnet. The stator elements and cup elements are connected to the alternating current and cycle at the frequency of the AC power. This rotates the magnet at the synchronous speed of the frequency.

In the center of the magnet is a worm gear which connects to second worm gear positioned perpendicular to worm gear attached to the circular magnet. As the magnet rotates the second worm gear also rotates. Attached to the second gear is a directional starting spring. The second worm gear connects to a series of gears which drive the numbers on the display face of the elapsed time meter. If this second gear is moving in the proper direction the directional starting spring slides on the second gear with its upper portion prevented from movement by the hour meter casing. If the second worm gear is moving in the wrong direction the starting spring is brought in contact with the rotating magnet. The rotating magnet has a cavity located on the axial surface. The directional starting spring contacts this cavity and stops rotation of the magnet. The magnet is pushed the other way by action of the spring, thereby forcing rotation of the magnet in the proper direction.

It is an object of this invention to ensure that a synchronous motor always rotates in the proper direction.

It is a further object of this invention to create a AC powered elapsed time meter that runs without excessive noise.

Yet another object of the invention is to create a reliable directional spring that can be easily and inexpensively manufactured.

These and other objects of the present invention will be understood more clearly by reference to the following figures and detailed description.

DESCRIPTION OF THE PREFERRED EMBODIMENT

Figure 1:
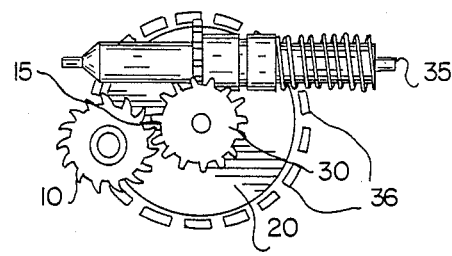
FIG. 1 shows the prior art directional starting mechanism.
Figure 2:
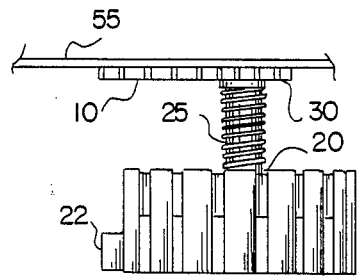
FIG. 2 shows a cross-sectional view of the prior art directional starting mechanism.

FIG. 1 shows an elapsed time meter in which a "funny wheel" 10 is used to ensure the AC synchronous motor rotates in the proper direction. FIGS. 1-2 show the directional starting mechanism of the prior art device. Attached to the magnet 20 is a first worm gear, 25, and on the top of the worm gear is notched gear 30. This notched gear 30 has notches on every fifth tooth. The slightly curved gear teeth of funny wheel 10 intermesh with the teeth of notched gear 30. Once AC power is applied to the stators 36, through leads 22 an alternating magnetic field is produced. This forces the magnet 20 to rotate in "synch" with the frequency of the AC power. If the magnet is rotating in the proper direction, in this case clockwise, notched gear 30 also rotates in the clockwise direction. The teeth of notched gear 30 intermesh with the teeth of the funny wheel 10 rotating the funny wheel in the counterclockwise direction. The funny wheel 10 is attached to the casing 55 of the eleapsed time meter. If the magnet 20 is rotating in the counterclockwise direction, the notched gear 30 also moves in the counterclockwise direction. The teeth on the notched gear 30 will intermesh with the teeth on the funny wheel 10 until a tooth on the funny wheel engages a notch 15 on a tooth of the notched gear 30. The notched gear 30 and magnet 20 are stopped from rotating in the counterclockwise direction. The magnet 20 then begins to rotate in the clockwise direction.

The device, although reliable, creates noise. Most of the noise comes from the teeth of the gear 30 and the teeth of the funny wheel 10 intermeshing. There is also noise created from the worm gear 25 as it intermeshes with the second worm gear 35 which drives the clock face mechanism. The noise comes about because worm gear 25 is manufactured by press molding with notched gear 30 attached. Because the notched gear 30 and worm gear 25 are manufactured as a single component, the mold to manufacture this part must be in two pieces to allow for removal of the part. Flashing of plastic on the worm gear at the intersection of the two mold pieces occurs when the worm gear is manufactured in this manner. This flashing on the worm gear creates noise when the motor is in operation as the worm gear 25 does not mesh smoothly with the second worm gear 35.

Figure 3:
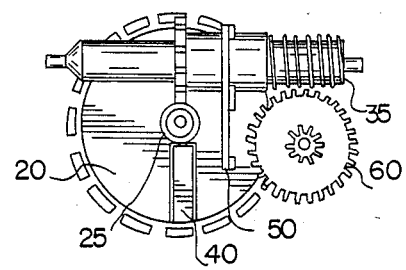
FIG. 3 shows the directional starting mechanism of the present invention.
Figure 4:
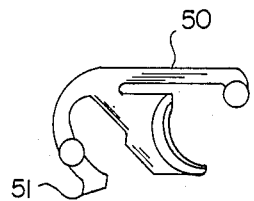
FIG. 4 shows a side view of the directional starting spring of the present invention.
Figure 5:
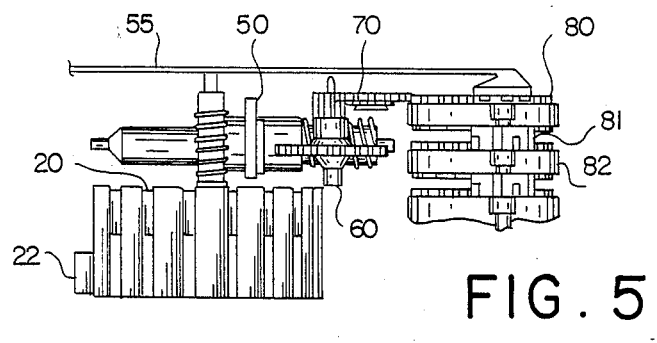
FIG. 5 shows a cross-sectional view of the directional starting mechanism of the present invention.

Shown in FIG. 3 and FIG. 5 is the directional starting mechanism of the present invention. In this device the magnet 20 has a recess 40 on its face. The magnet is attached to a worm gear 25 but without notched gear 30. The worm gear 25 drives the second worm gear 35 which drives the clock face. Attached to this second worm gear 35 is a directional spring 50. The directional spring 50 is shown from the side in FIG. 4. This spring 50 is attached in a manner that allows it to spin on the second worm gear 35. If the magnet 20 is rotating in the proper direction, in this case clockwise, then the second worm gear rotates in clockwise direction and the directional spring 50 is stopped by the housing 55 of the meter. The meter records time as the directional spring 50 slides on the second worm gear 35. If the magnet 20 is rotating in a counterclockwise direction, second worm gear 35 is driven in a counterclockwise direction. This rotates the directional starting spring 50 down to the magnet face where it contacts the surface of the magnet 50. When the recess 40 of the magnet contacts the spring 50 at the protruding notch 51 of the spring, the magnet is stopped. The protruding notch 51 of the directional spring absorbs energy from the magnet and releases this energy as it pushes the magnet in the proper (clockwise) direction.

Figure 6:
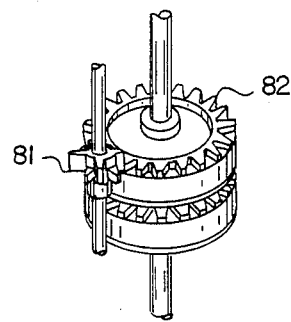
FIG. 6 shows the interrupted gear-transfer between the recording wheels.

FIGS. 5 and 6 shows the mechanical counter mechanism that is used to record the elapsed time. As the second worm gear 35 is rotated it rotates speed reducing gears 60 and 70. Gear 70 intermeshes with driving gear 80 which in turn intermeshes with pinion 81 which rotates the next driving gear 82. The driving gear 82 has digits on its face with displays the least significant digit of the recorded time. A number of pinions and driving gears are connected in series to show as many significant digits for the elapsed time as desired.

The advantage of this design is that worm gear 25 can be made in a one piece mold thereby eliminating flashing. The worm gear 25 is removed from the mold by unscrewing the worm gear. The funny wheel 10 and notched gear 30 are eliminated. This reduces noise from the movement and intermeshing of the gears in the elapsed time meter.

While the foregoing has been described with reference to its preferred embodiment, various alterations and modifications will occur to those skilled in the art. For example, a synchronous motor with fewer stators might be constructed. These and other modifications are intended to fall within the scope of the claims.

What is claimed:

1. A timing mechanism comprising:
   a housing;
   an AC synchronous motor secured to said housing including a plurality of stator and cups surrounding a circular permanent magnet, said plurality of stators and cups connectable to AC power;
   a first worm gear axially mounted on said circular magnet;
   a second worm gear oriented perpendicular to said first worm gear and intermeshed with said first worm gear so that said first worm gear rotates said second gear;
   a directional spring rotatably positioned on said second worm gear so that said spring contacts said housing when said second worm gear is rotated one direction and said spring contacts said permanent magnet when said second worm gear is rotated in a second direction wherein said spring stops said permanent magnet and pushes said permanent magnet in an opposite direction;
   means connected to said second worm gear to record time when said second worm gear is rotating;
   means to connect said AC sychronous motor to AC power.

2. The timing mechanism of claim 1 wherein the means connected to said second worm gear to record time comprises
   a first speed reducing gear connected to said second worm gear;
   a second speed reducing gear connected to said first speed reducing gear;
   a driving gear connected to said second speed reducing gear wherein said driving gear alternately rotates a series of pinions and a series of recording gears, said recording gears displaying elapsed time.

3. The timing mechanism of claim 1 wherein said magnet includes an indentation on an axial face and said directional spring includes a notch which engages the indentation when the magnet is rotated in the second direction.

4. A directional starting mechanism comprising:
   a housing;
   an AC sychronous motor secured to said housing which includes a rotating permanent magnet having an indentation on an axial face;
   a first worm gear axially mounted on said rotating magnet;
   a second worm gear oriented perpendicular to said first worm gear and intermeshed with said first worm gear so that said first gear rotates said second gear;
   a directional spring mounted on said second worm gear so that said spring rotates with said second worm gear but slides on said second worm gear when prevented from rotating with minimal friction on said second worm gear, wherein said directional spring contacts said housing and slides on said second worm gear when said second worm gear is rotated in one direction and said directional spring contacts the indentation on the axial face of said magnet when said second worm gear is rotated in a second direction thereby stopping said magnet and pushing it in the opposite direction;
   means connected to said second worm gear to record and display elapsed time;
   means to connect said AC sychronous motor to AC power.

5. The direction starting mechanism of claim 4 said means connected to said second gear comprising:
   a first speed reducing gear connected to said second worm gear;
   a second speed reducing gear connect to said first speed reducing gear;
   a driving gear connected to said second speed reducing gear wherein said driving gear alternately rotates a series of pinions and a series of recording gears, said recording gears displaying elapsed time.

6. The direction starting mechanism according to claim 4 wherein the directional starting spring includes a protruding notch which contacts the indentation on the axial face of the magnet when the second worm gear is rotated in the second direction, the protruding notch stops the magnet and absorbs energy and releases the energy by pushing the magnet in the opposite direction.

7. The directional starting mechanism according to claim 1 wherein the directional starting spring is made of plastic.

8. The timing mechanism according to claim 4 wherein the directional spring is made of plastic.

* * * * *